ns Patent [19]

Iida et al.

[11] Patent Number: 4,523,830
[45] Date of Patent: Jun. 18, 1985

[54] AUTOMATIC CONTROL TYPE ELECTRONIC FLASH APPARATUS

[75] Inventors: Yoshikazu Iida, Chigasaki; Nobuyoshi Hagyuda; Hiroshi Hasegawa, both of Tokyo, all of Japan

[73] Assignee: Nippon Kogaku K.K., Tokyo, Japan

[21] Appl. No.: 424,336

[22] Filed: Sep. 27, 1982

[30] Foreign Application Priority Data

Oct. 29, 1981 [JP] Japan .................................. 56-173471

[51] Int. Cl.$^3$ .......................... G03B 7/16; G03B 15/02
[52] U.S. Cl. ..................... 354/416; 354/429; 354/474; 354/127.1
[58] Field of Search ..................... 354/33, 34, 35, 127, 354/60 E, 60 F, 128, 31, 145, 127.1-127.13, 413, 416, 417, 429, 471-474, 420; 315/133, 134, 135, 136, 151

[56] References Cited

U.S. PATENT DOCUMENTS

| | | | |
|---|---|---|---|
| 3,626,827 | 12/1971 | Yanagi et al. | 354/420 |
| 4,100,459 | 7/1978 | Nakamura et al. | 315/134 X |
| 4,122,465 | 10/1978 | Hasegawa et al. | 354/32 |
| 4,258,991 | 3/1981 | Kuraishi | 354/127.13 X |
| 4,331,400 | 5/1982 | Brownstein et al. | 354/33 |
| 4,362,369 | 12/1982 | Kazami et al. | 354/127.11 X |

Primary Examiner—L. T. Hix
Assistant Examiner—Della J. Rutledge
Attorney, Agent, or Firm—Fitzpatrick, Cella, Harper & Scinto

[57] ABSTRACT

An automatic control type electronic flash apparatus comprises means for emitting flashlight and flashlight emission stopping means. The stopping means receives the flashlight emitted by the flashlight emitting means and reflected by an object to be photographed and stops the emission of the flashlight by the flashlight emitting means when a quantity of the flashlight received reaches a predetermined value. The flash unit includes integrating means for integrating a current corresponding to the flashlight emitted by the flashlight emitting means in place of the flashlight reflected by the object and comparing means. The comparing means compares an integrated value from the integrating means with a reference value and generates a first output when the integrated value is smaller than the reference value and a second output when the integrated value is greater than the reference value. The flash unit includes indicating means for showing an over-exposure in response to the first output.

3 Claims, 6 Drawing Figures

| FIG. 2A | FIG. 2B |

AUTOMATIC CONTROL TYPE ELECTRONIC FLASH APPARATUS

BACKGROUND OF THE INVENTION

1. Field of the Invention

The present invention relates to an automatic control type electronic flash apparatus which is capable of automatically controlling the quantity of light emitted and, more particularly, to a device for indicating whether or not the quantity of light emitted provides an over-exposure.

In an automatic control type electronic flash unit of the type described above, flashlight emitted by the flash unit and reflected by an object to be photographed is received by a light-receiving element. When the quantity of light received reaches a predetermined value which provides a proper exposure, the light-receiving element generates an emission stop signal to stop the flash operation of the unit. FIG. 1 schematically shows the strength of flashlight emitted by the flash unit toward the object as a function of emission time. The ratio of the quantity of light received by the light-receiving element to the quantity of light emitted by the flash unit decreases with an increase in the distance between a camera and the object to be photographed. Therefore, when the object is at a relatively great distance from the camera, a great quantity of light must be emitted to provide a proper exposure. As may be seen from FIG. 1, the emission stop signal is generated at time $\tau 1$ after a considerable time period from flash emission start time $\tau 0$ so as to interrupt the emission of flashlight. Thus, a relatively great quantity of light represented by an area S1 is emitted. On the other hand, when the object is near the camera, the above-mentioned ratio increases and the quantity of light which provides a proper exposure decreases. For example, when the object is very close to the camera, the emission stop signal is generated at time $\tau 2$ immediately after time $\tau 0$, and the quantity of light emitted up to this point corresponds to an area S2 which is very small. There is a predetermined delay time $\Delta \tau$ between generation of the emission stop signal and interruption of the flashlight emission. The flash unit emits excess quantities of light $\Delta S1$ and $\Delta S2$ during the predetermined delay time $\Delta \tau$. The excess quantity of light $\Delta S1$ emitted when the object is at a relatively great distance from the camera is sufficiently smaller than the relatively great quantity of light corresponding to the area S1 to be negligible. For this reason, a proper exposure may be obtained despite the excess quantity of light $\Delta S1$. In contrast to this, the excess quantity of light $\Delta S2$ emitted when the object is very close to the camera is not negligible in comparison with the relatively small quantity of light corresponding to the area S2 and provides an over-exposure. Two methods for detecting an over-exposure in flash photography of a near object are disclosed in U.S. Pat. No. 4,122,465 assigned to Nippon Kogaku K.K. According to the first method disclosed in this patent, an over-exposure is indicated if an emission stop signal is generated within a predetermined time from flash emission start (or triggering for light emission). According to this method, since the charged voltage in a main capacitor for flash operation is not always constant, the amount of flashlight during the predetermined time does not become constant so that reliable indication of an over-exposure may not be guaranteed. According to the second method, the quantity of light reflected by the object to be photographed is received and a current corresponding thereto is integrated. When the integrated current exceeds a predetermined value, an over-exposure is indicated. According to this method, the detection precision is not affected by the charged voltage of the main capacitor, as in the first system, so that a more reliable indication of an over-exposure may be performed. However, the voltage integrated by an integrating capacitor is an analog voltage which is easily subject to noise in the transmission system. For this reason, the detecting circuit must be arranged near the integrating capacitor. This limits the circuit design significantly. Furthermore, when metering circuits are arranged in the flash unit and the camera, respectively and, TTL control is performed (whereby light transmitted through the photo-taking lens is measured and the quantity of light emitted by the flash unit is controlled according to the measurement) using the metering circuit of the camera as needed or when the metering circuit of the flash unit is used, the detecting circuit must be incorporated for both the camera and the flash unit since it must be close to the integrating capacitor.

SUMMARY OF THE INVENTION

It is an object of the present invention to provide an over-exposure indicating device for a flash photography, which is capable of allowing free selection of the arrangement of the over-exposure detecting circuit, and which is highly reliable without being affected by the charged voltage in a main capacitor.

It is another object of the present invention to provide a display device for a flash unit, which is capable of displaying an over-exposure or an under-exposure, and of detecting that flash operation is not performed despite the operation of a synchro switch of the camera, that is, of displaying a failure of flash operation.

DESCRIPTION OF THE PREFERRED EMBODIMENT

The preferred embodiment of the present invention will now be described with reference to the accompanying drawings.

Figure 1:
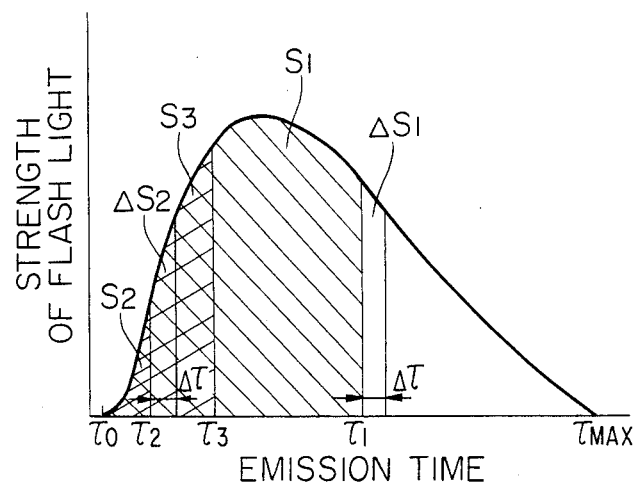
FIG. 1 is a graph showing the strength of flash emitted by the flash unit as a function of emission time.
Figures 2, 2A:
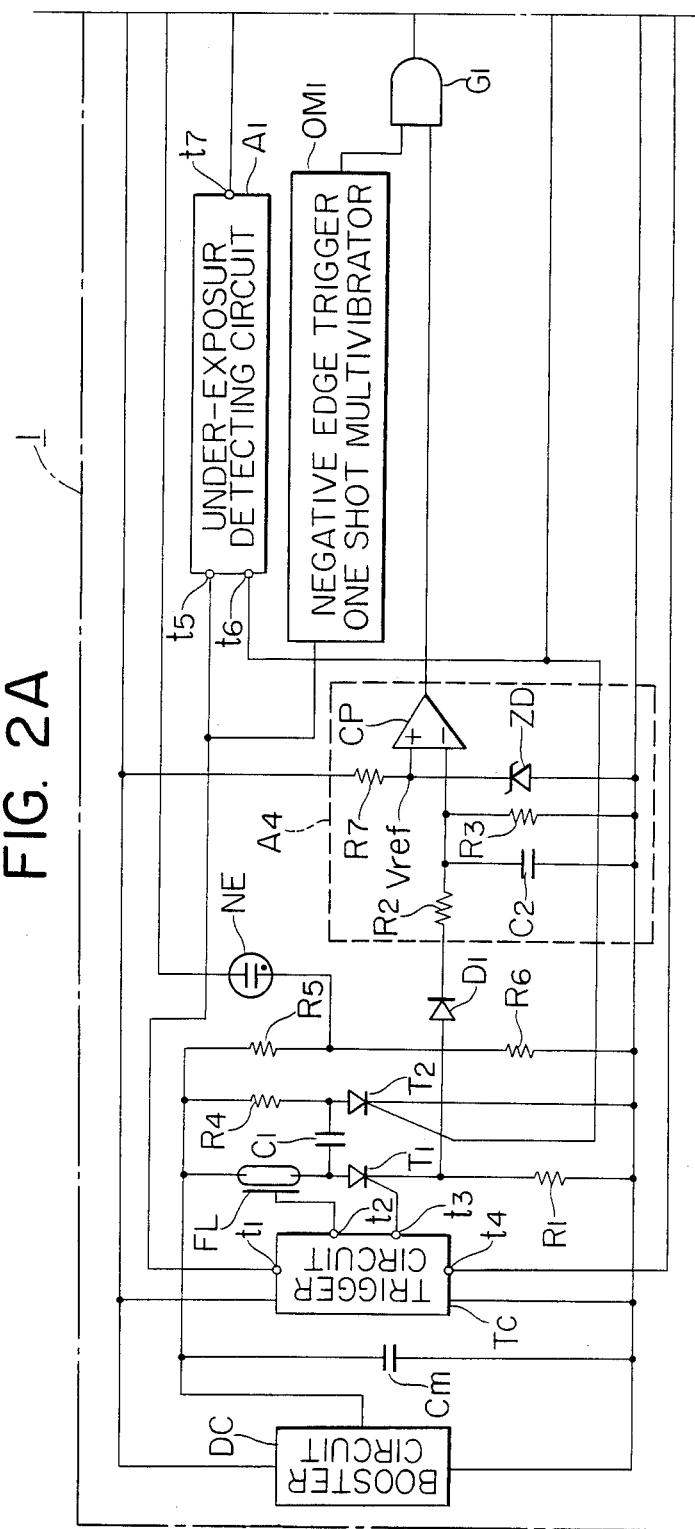
FIG. 2 composed of FIGS. 2A and 2B, is a circuit diagram of an embodiment of the present invention.
Figure 2B:
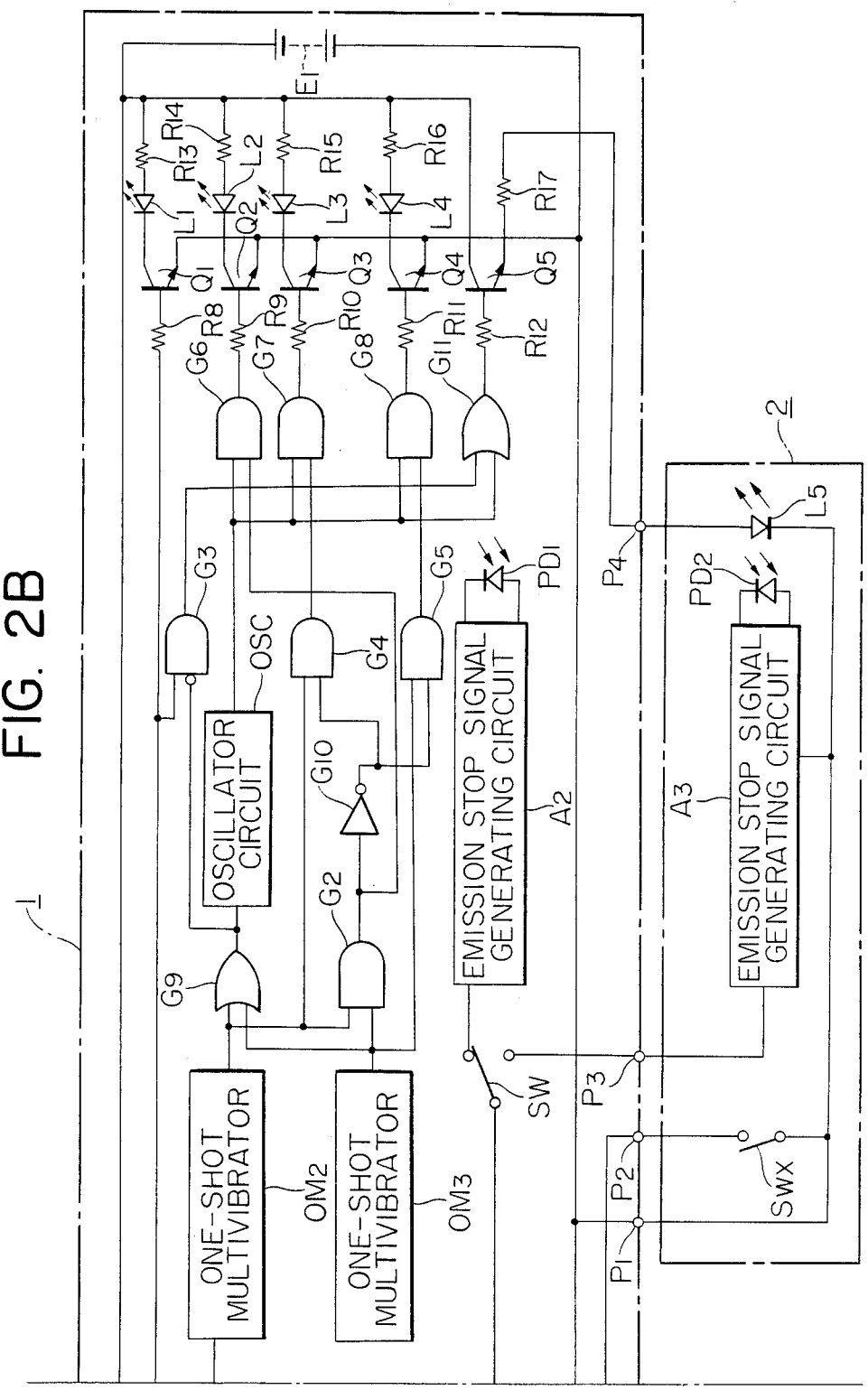

Referring to FIG. 2, an electronic flash unit 1 and a camera 2 are connected through connectors P1, P2, P3 and P4. The circuitry of the electronic flash unit 1 will first be described. A booster circuit DC boosts a voltage from a power source E1 to charge a main capacitor Cm. A flash discharge tube FL, a main thyristor T1 and a resistor R1 are connected in series with each other, and the series circuit FL, T1, R1 thereof is connected in parallel with the main capacitor Cm. A trigger circuit TC is powered by the power source E1 and has output terminals t1, t2 and t3 and an input terminal t4. The input terminal t4 is connected to a synchro switch SWx of the camera 2 through the connector P2 to receive an ON signal or the synchro signal of the switch SWx. The output terminal t1 is connected to a first input terminal t5 of an under-exposure detecting circuit A1 and to the input terminal of a negative edge trigger one shot multivibrator OM1. The output terminals t2 and t3 are respectively connected to the trigger electrode of the flash discharge tube FL and to the gate of the main thyristor T1. Upon reception of the synchro signal, the trigger circuit TC generates a trigger pulse at the output terminals t2 and t3 to excite the flash discharge tube FL and to turn on the main thyristor T1 thereby starting the flash operation. The trigger circuit TC includes a one shot multivibrator and produces an output signal of high level at the output terminal t1 from the reception of the synchro signal until a predetermined time which is equal to or longer than a maximum light emission time $\tau$max (FIG. 1) of the flash discharge tube FL. In response to the negative edge or the trailing edge of the output signal from the output terminal t1, the negative edge trigger one shot multivibrator OM1 generates a positive impulse. The impulse referred to herein is a pulse whose pulse width is very short. A capacitor C1 and a thyristor T2 make up the emission stopping circuit. When the thyristor T2 is rendered conductive, the main thyristor T1 is rendered nonconductive by the discharging current of the capacitor C1 so as to stop light emission. A resistor R4 is a charging resistor for the capacitor C1. A series circuit of resistors R5 and R6 makes up a voltage divider which divides the charging voltage of the main capacitor Cm. A neon tube NE connected to this voltage divider is turned on when it detects that the charging voltage of the main capacitor Cm has reached a value which allows light emission. A CR integrating circuit consisting of a resistor R2 and a capacitor C2 is connected to the cathode of the main thyristor T1 through a rectifying diode D1. A discharging resistor R3 is connected in parallel with the capacitor C2. A series circuit of a resistor R7 and a Zener diode ZD makes up a reference voltage source which applies a reference voltage Vref to the non-inverting input terminal of a comparator CP. The inverting input terminal of the comparator CP is connected to the node between the resistor R2 and the capacitor C2 to receive an integration output of the integrating circuit (R2 and C2). The integrating circuit (R2 and C2), the discharging resistor R3, the reference voltage source (R7 and ZD), and the comparator CP as described above make up an over-exposure detecting circuit A4.

The value of the reference voltage Vref is determined in the manner to be described below. Referring to FIG. 1, a proper exposure is obtained when time $\tau$ for generating the emission stop signal is as great as $\tau$1, while an over-exposure is obtained when time $\tau$ is as small as $\tau$2. Time at the boundary between the time which provides a proper exposure and the time which provides an over-exposure is defined as $\tau$3. The value or area S3 corresponding to the quantity of light from time $\tau$0 to time $\tau$3 (to be referred to as a critical quantity of light hereinafter) is defined as the reference voltage Vref. When the reference voltage Vref is defined in this manner, it represents the critical quantity of light.

Figure 3:
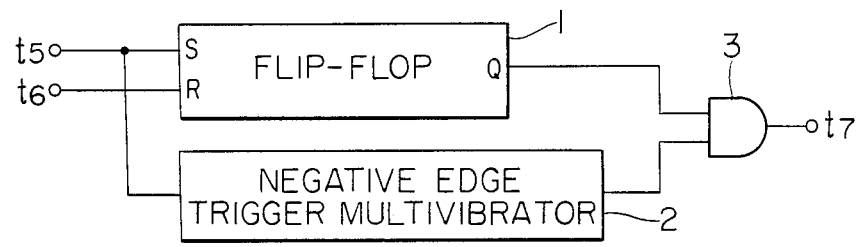
FIG. 3 is a circuit diagram of an under-exposure detecting circuit shown in FIGS. 2A and 2B.

Since the integrating circuit (R2 and C2) integrates part of the discharging current flowing through the flash discharge tube FL while the discharge tube FL is emitting light, the integrated value from the integrating circuit represents the quantity of light emitted from the start of flash operation. The comparator CP detects if the integrated value or voltage has exceeded the reference voltage Vref, that is, whether the quantity of light emitted by the flash discharge tube FL has exceeded the critical quantity of light. When the integrated voltage is less than the reference voltage, the comparator CP produces a signal of high level. When the integrated voltage is greater than the reference voltage, the comparator CP produces a signal of low level. If the integrated voltage has not reached the reference voltage by time $\tau$max, an over-exposure of flash failure has occurred. If the integrated voltage has exceeded the reference voltage, a proper exposure or an under-exposure has occurred. In the over-exposure detecting circuit A4, if the flash photography results in an over-exposure or a failure of light emission, the comparator CP produces a signal of high level in the vicinity of time $\tau$max. In the case of an under or proper exposure, the comparator CP produces a signal of low level. An emission stop signal generating circuit A2 includes a photodiode PD1 which receives the light reflected by the object. When the quantity of the received light reaches a value which provides a proper exposure, the emission stop signal generating circuit A2 generates a positive pulse as an emission stop signal. The emission stop signal thus generated is supplied to the gate of the thyristor T2 and to a second input terminal t6 of the under-exposure detecting circuit A1 through a selector switch SW. An output terminal t7 of the under-exposure detecting circuit A1 is connected to the input terminal of a one shot multivibrator OM2. As shown in FIG. 3, the under-exposure detecting circuit A1 consists of an R-S flip-flop 1, a negative edge trigger one shot multivibrator 2, and an AND gate 3. The set and reset terminals of the R-S flip-flop 1 are respectively connected to the terminals t5 and t6. The Q output terminal of the R-S flip-flop 1 is connected to one input terminal of the AND gate 3. The input terminal of the one shot multivibrator 2 is connected to the terminal t5 while the output terminal thereof is connected to the other input terminal of the AND gate 3. The multivibrator 2 produces a positive impulse in accordance with the negative edge of the signal appearing at the terminal t5. The under-exposure detecting circuit A1 generates a positive impulse at time $\tau$max in the case of an under-exposure or a failure of light emission. The under-exposure detecting circuit A1 produces a signal of low level in the case of an over-exposure and a proper exposure. In response to the positive impulse from the detecting circuit A1, the one shot multivibrator OM2 generates a signal of high level for a predetermined period of the time, for example, 2 to 3 seconds. An AND gate G1 receives the output from the multivibrator OM1 and the output from the comparator CP and produces an output which is supplied to a one shot multivibrator OM3. In response to the positive pulse from the AND gate G1, the one shot multivibrator OM3 produces a signal of high level for the same duration as that of the one shot multivibrator OM2.

The output from the one shot multivibrator OM2 is supplied to an OR gate G9, an AND gate G2 for detecting failure of light emission, and an AND gate G4 for detecting an under-exposure. The output from the one shot multivibrator OM3 is supplied to the OR gate G9, the AND gate G2, and an AND gate G5 for detecting an over-exposure. The output from the OR gate G9 is supplied to an oscillator OSC and is also supplied to one input terminal of an AND gate G3 through an inverter. In response to the output signal of high level from the OR gate G9, the oscillator OSC oscillates. In response to the output signal of low level from the OR gate G9, the oscillator OSC generates a signal of low level. The other input terminal of the AND gate G3 is connected to the node between the resistors R5 and R6 through the neon tube NE. The output from the AND gate G2 is supplied to one input terminal of each of the AND gates G4 and G5 through an inverter G10 and to one input terminal of an AND gate G6. The output terminal of the oscillator OSC is connected to the other input terminal of the AND gate G6, and one input terminal of each of AND gates G7 and G8 and of a NOR gate G11. The output terminals of the AND gates G4 and G5 are respectively connected to the other input terminal of the AND gates G7 and G8. The output terminal of the AND gate G3 is connected to the other input terminal of the NOR gate G11. Transistors Q1, Q2, Q3, Q4 and Q5 are connected through current-limiting resistors R8, R9, R10, R11 and R12, respectively, to the node between the input terminal of the AND gate G3 and the neon tube NE, and to the outputs of the AND gates G6, G7 and G8 and of the NOR gate G11, respectively. The collectors of the transistors Q1 to Q4 are respectively connected to light-emitting diodes L1 to L4 which are connected to the positive terminal of the power source E1 through current-limiting resistors R13, R14, R15 and R16, respectively. The emitter of the transistor Q5 is connected to the positive terminal of the power source E1, and its collector is connected to a light-emitting diode L5 of the camera through a resistor R17 and the connector P4. The light-emitting diode L1 is a "ready" light and indicates that the charged voltage of the main capacitor Cm has reached a predetermined value. The light-emitting diode L2 is an alarm lamp for signalling a failure of light emission. The light-emitting diode L3 is an under-exposure warning lamp, and the light-emitting diode L4 is an over-exposure warning lamp.

The circuitry of the camera will now be described.

An emission stop signal generating circuit A3 includes a photodiode PD2 which receives light transmitted through a photo-taking lens. When the quantity of light which is reflected and which becomes incident on the photodiode PD2 reaches a value which provides a proper exposure, the emission stop signal generating circuit A3 generates a positive pulse as the emission stop signal. This emission stop signal is supplied to the thyristor T2 and to the terminal t6 through the connector P3 and the selector switch SW. The synchro switch SWx is closed to produce the synchro signal when the shutter is fully opened. The light-emitting diode L5 can be viewed through the viewfinder to provide various warnings including completion of the charging operation of the main capacitor.

The states of the outputs from the under-exposure detecting circuit A1 and the over-exposure detecting circuit A4 at time near time τmax are shown in the table below:

|    | Over-exposure | Under-exposure | Proper exposure | Failure of light emission |
| --- | --- | --- | --- | --- |
| A1 | L | H | L | H |
| A4 | H | L | L | H |

This will be further described.

(1) Completion of Charging Operation of the Main Capacitor

When the main capacitor Cm is charged by the booster circuit DC and the charged voltage of the main capacitor Cm reaches a value which allows light emission, the neon tube NE is turned on. This then turns on the transistor Q1 and lights up the light-emitting diode L1. Since the trigger circuit TC is producing a signal of low level during this time, the detecting circuit A1 and the one shot multivibrator OM1 are both at low level. Therefore, both of the one shot multivibrators OM2 and OM3 are at low level, and the outputs of low level therefrom are supplied to the AND gate G3 through the OR gate G9. The AND gate G3 thus produces an output of high level which makes the output from the NOR gate G11 go low to turn on the transistor Q5. Upon turning on of the transistor Q5, the light-emitting diode L5 of the camera goes on. The light-emitting diodes L2 to L4 remain OFF. In this manner, the light-emitting diodes L1 and L5 respectively indicate completion of the charging operation of the main capacitor.

(2) Proper Exposure

In the following description, the selector switch SW is connected to the emission stop signal generating circuit A2. However, the mode of operation is the same even if the selector switch SW is connected to the emission stop signal generating circuit A3.

When the synchro switch SWx of the camera is closed and the synchro signal is generated, the trigger circuit TC produces to the output terminal t1 a signal of high level which has a duration up to time τmax and produces the trigger pulses at the output terminals t2 and t3. The signal of high level from the trigger circuit TC sets the flip-flop 1 shown in FIG. 3. The trigger pulses excite the flash discharge tube FL and turn on the main thyristor T1. Then, the flash discharge tube FL starts flashing. The integrating circuit (R2 and C2) integrates part of the discharging current flowing through the flash discharge tube FL and produces an integrated voltage representing the quantity of light. When this quantity of light exceeds the critical quantity of light corresponding to an area S3 shown in FIG. 1, the integrated voltage exceeds the reference voltage Vref and the output from the comparator CP goes from high level to low level. Thereafter, when the quantity of light reflected by the object reaches a value which provides a proper exposure, the emission stop signal generating circuit A2 generates an emission stop signal which turns on the thyristor T2 to interrupt the light emission of the flash discharge tube FL. The emission stop signal also resets the flip-flop 1 of the under-exposure detecting circuit A1. When the output of high level from the output terminal t1 of the trigger circuit TC goes to low level at a time near time τmax, the one shot multivibrator 2 in the detecting circuit A1 and the one shot multivibrator OM1 both generate positive impulses of high level. Since the outputs from the flip-flop 1 and the comparator CP are both at low level at this time, the outputs from the AND gates 3 and G1 are both at low level. The outputs from the one shot multivibrators OM2 and OM3 are both at low level. Therefore, the oscillator OSC does not oscillate, and the outputs from the AND gates G2, G4 and G5 are at low level. The transistors Q2 to Q4 are OFF and the light-emitting diodes L2 to L4 are OFF. When flash photography is performed in this state, the OFF states of the light-emitting diodes L2 to L4 indicate the proper exposure. If the main capacitor Cm is sufficiently charged at this time, the light-emitting diodes L1 and L5 are ON, and are OFF otherwise.

(3) Over-exposure

Before the integrated voltage from the integrating circuit (R2 and C2) exceeds the reference voltage Vref, the emission stop signal generating circuit A2 generates an emission stop signal to interrupt light emission of the flash discharge tube FL. For this reason, the integrated voltage from the integrating circuit (R2 and C2) may not exceed the reference voltage Vref, and the output from the comparator CP is kept at high level. Since the flip-flop 1 is reset by the emission stop signal, the output from the under-exposure detecting circuit A1 is kept at low level. When the output from the output terminal t1 goes from high level to low level at a time near time τmax, the one shot multivibrator OM1 generates an impulse of high level. Since the output from the comparator CP at this time is at high level, the AND gate G1 produces an impulse of high level, and the one shot multivibrator OM3 generates an output of high level for a predetermined period of time. The output from the one shot multivibrator OM2 is kept at low level. The output of high level from the one shot multivibrator OM3 turns on the oscillator OSC and causes the output from the AND gate G5 to become high. In response to the oscillation output from the oscillator OSC supplied through the AND gate G8, the transistor Q4 cause the light-emitting diode L4 flash. Since the output from the AND gate G3 is at low level due to the output of high level from the one shot multivibrator OM3, the transistor Q5 also responds to the oscillation output from the oscillator OSC to cause the light-emitting diode L5 to flash. Since the output from the one shot multivibrator OM2 is at low level, the AND gates G2, G4, G6 and G7 become low and the light-emitting diodes L2 and L3 remain nonemissive. The flashing of the light-emitting diode L4 indicates an over-exposure, while the that of the light-emitting diode L5 of the camera indicates that the proper exposure is not achieved.

(4) Under-exposure

Since the quantity of light which provides a proper exposure is not received even when a time τmax has elapsed from the flash photography, the emission stop signal generating circuit A2 does not produce an emission stop signal. Since the integrated voltage from the integrating circuit (R2 and C2) has exceeded the reference voltage Vref before time τmax, the output from the comparator CP is low level, and the outputs from the AND gate G1 and the multivibrator OM3 remain at low level. The flip-flop 1 of the under-exposure detecting circuit A1 remains set since the emission stop signal is not generated. Then, the output from the terminal t1 changes from high level to low level at a time near τmax, in response to which the multivibrator 2 of the detecting circuit A1 generates an impulse of high level to render the output of the AND gate G3 at high level, and the multivibrator OM2 generates an output of high level for a predetermined period of time. This output of high level from the multivibrator OM2 turns on the oscillator OSC and causes the AND gate G4 to become high. In response to the oscillation output from the oscillator OSC supplied through the AND gate G7, the transistor Q3 causes the light-emitting diode L3 to flash. The transistor Q5 also causes the light-emitting diode L5 to flash. The light-emitting diodes L2 and L4 are kept off by the output of low level from the multivibrator OM3. The flashing of the light-emitting diode L3 indicates an under-exposure, while the that of the light-emitting diode L5 indicates that the proper exposure was not obtained.

(5) Failure of Light Emission

There are cases where light is not emitted due to insufficient charging of the main capacitor or the like despite the fact the trigger circuit TC generates the trigger pulse to the output terminals t2 and t3 by the synchro signal. In such a case, the integrating circuit (R2 and C2) does not perform integration, and the output from the comparator CP remains high. Since the emission stop signal generating circuit A2 does not produce an emission stop signal, the flip-flop 1 of the under-exposure detecting circuit A1 may not be reset after being set by the output from the terminal t1 of the trigger circuit TC. When the terminal t1 goes from high level to low level, the one shot multivibrators OM2 and OM3 both generate outputs of high level for a predetermined period of time. These outputs of high level turn on the oscillator OSC and cause the output from the AND gate G2 to become high. In response to the oscillation output from the oscillator OSC supplied through the AND gate G6, the transistor Q2 causes the light-emitting diode L2 to flash. The transistor Q5 also causes the light-emitting diode L5 to flash. Since the outputs from the AND gates G4, G5, G7 and G8 are at low level, the light-emitting diodes L3 and L4 remain OFF. Thus, the flashing of the light-emitting diode L2 indicates the failure of light emission.

According to the present invention, a proper exposure, an over-exposure, an under-exposure, and a failure of light emission may be discriminated and may be indicated. This is achieved utilizing the fact that the combinations of the output states from the under-exposure detecting circuit A1 and the over-exposure detecting circuit A4 are different in each of the four cases as described above. Conventionally, an under-exposure and a failure of light emission have been difficult to discriminate since, in either case, the emission stop signal is not generated. However, according to the present invention, the under-exposure and failure of light emission may be discriminated by the output from the over-exposure detecting circuit.

Figure 4:
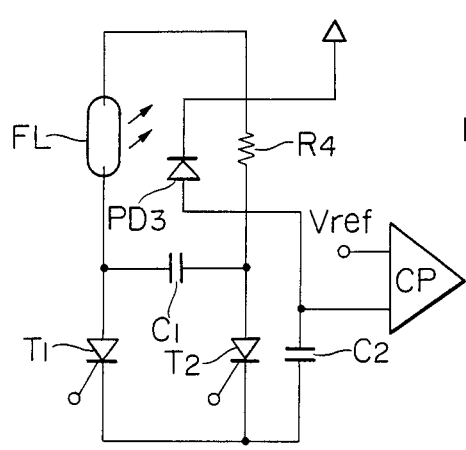
FIGS. 4 and 5 are circuit diagrams showing modifications of integration circuits, respectively.
Figure 5:
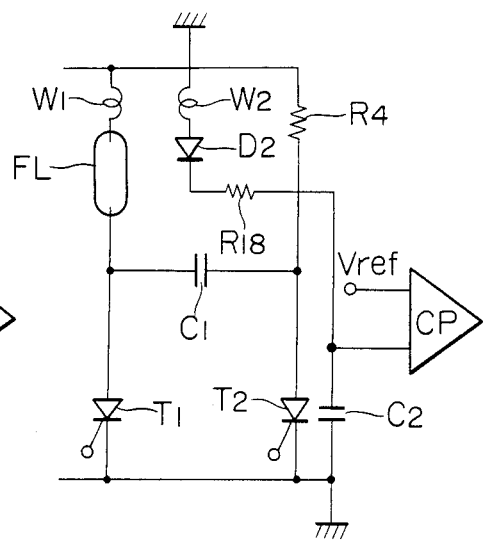

Another example of the integrating circuit of the over-exposure detecting circuit A4 is shown in FIGS. 4 and 5.

Referring to FIG. 4, a photodiode PD3 interposed between the power source E1 and an integrating capacitor C2 directly receives flashlight from the flash discharge tube in place of the light reflected by the object. The integrating capacitor C2 integrates the photocurrent of the photodiode PD3.

Referring to FIG. 5, a first coil W1 is connected in series with a flash discharge tube FL. The integrating circuit comprises a second coil W2 magnetically coupled to the first coil W1, a rectifying diode D2 connected in series therewith, a resistor R18 connected in series therewith, and an integrating capacitor C2 interposed between the resistor R18 and the second coil W2. When a discharging current flows through the flash discharge tube FL, a current corresponding to the discharging current flows to the second coil W2 due to the magnetic coupling between the first and second coils W1 and W2, and the integrating capacitor C2 integrates the current.

In the description given above, the integrating circuit and the light-emitting diodes L2 to L4 for indicating a failure of light emission, an under-exposure, an over-exposure and a proper exposure are arranged at the side of the electronic flash unit. However, they may alternatively be arranged at the side of the camera. The indicating elements need not be optical indicating elements and may be, for example, sound generating elements.

We claim:

1. An automatic control type electronic flash apparatus comprising:
   (a) means for emitting flashlight, which means include a flash discharge tube, a first coil connected in series therewith, and a main capacitor for supplying a discharging current to said flash discharge tube;
   (b) flashlight emission stopping means for receiving the flashlight emitted by said flashlight emitting means and reflected by an object to be photographed and for stopping emission of the flashlight by said flashlight emitting means when a quantity of the flashlight received reaches a predetermined value;
   (c) integrating means for integrating a current corresponding to the flashlight emitted by said flashlight emitting means instead of the flashlight reflected by the object, said integrating means including a second coil magnetically coupled to said first coil, and an integrating circuit for integrating a current associated with a current generated in said second coil;
   (d) comparing means for comparing an integrated value from said integrating means with a reference value and for generating a first output when the integrated value is smaller than the reference value and a second output when the integrated value is greater than the reference value; and
   (e) indicating means for indicating an over-exposure in response to the first output.

2. An automatic control type electronic flash apparatus comprising:
   (a) means for emitting flashlight;
   (b) flashlight emission stopping means for receiving the flashlight emitted by said flashlight emitting means and reflected by an object to be photographed and for stopping emission of the flashlight by said flashlight emitting means when a quantity of the flashlight received reaches a predetermined value;
   (c) integrating means for integrating a current corresponding to the flashlight emitted by said flashlight emitting means instead of the flashlight reflected by the object;
   (d) comparing means for comparing an integrated value from said integrating means with a reference value and for generating a first output when the integrated value is smaller than the reference value and a second output when the integrated value is greater than the reference value;
   (e) indicating means for indicating an over-exposure in response to the first output;
   wherein said comparing means generates the first output when one of an over-exposure and a failure of light emission is detected and the second output when one of an under-exposure and a proper exposure is detected, and further comprising detecting means for detecting whether or not said flashlight emitting means stops emission of the flashlight, and said detecting means generating a third output representing one of the proper exposure and the over-exposure when said flashlight emitting means stops emitting the flashlight and generating a fourth output representing one of the under-exposure and the failure of light emission when said flashlight emitting means does not stop emission of the flashlight; and
   said indicating means indicates the over-exposure in response to the first and third outputs, the failure of light emission in response to the first and fourth outputs, the proper exposure in response to the second and third outputs, and the under-exposure in response to the second and fourth outputs.

3. An automatic control type electronic flash apparatus comprising:
   (a) means for emitting flashlight;
   (b) flashlight emission stopping means for receiving the flashlight emitted by said flashlight emitting means and reflected by an object to be photographed and for stopping emission of the flashlight by said flashlight emitting means when a quantity of the flashlight received reaches a predetermined value;
   (c) means responsive to said flashlight emitting means for producing an output corresponding to the quantity of the flashlight emitted by said flashlight emitting means instead of the quantity of the flashlight reflected by the object;
   (d) comparing means for comparing said output of said responsive means with a reference value and for generating a first output representing one of an over-exposure and a failure of light emission when said output of said responsive means is smaller than said reference value and a second output representing one of an under-exposure and a proper exposure when said output of said responsive means is greater than said reference value;
   (e) detecting means for detecting whether or not said flashlight emitting means stops emission of the flashlight and for generating a third output representing one of the proper exposure and the over-exposure when said flashlight emitting means stops emission of the flashlight and generating a fourth output representing one of the under-exposure and the failure of light emission when said flashlight emitting means does not stop emission of the flashlight; and
   (f) indicating means indicates the over-exposure in response to the first and third outputs, the failure of light emission in response to the first and fourth outputs, the proper exposure in response to the second and third outputs, and the under-exposure in response to the second and fourth outputs.

* * * * *